C. H. BASSETT.
Japanning Corset Steels.
No. 42,457.  Patented Apr. 26, 1864.
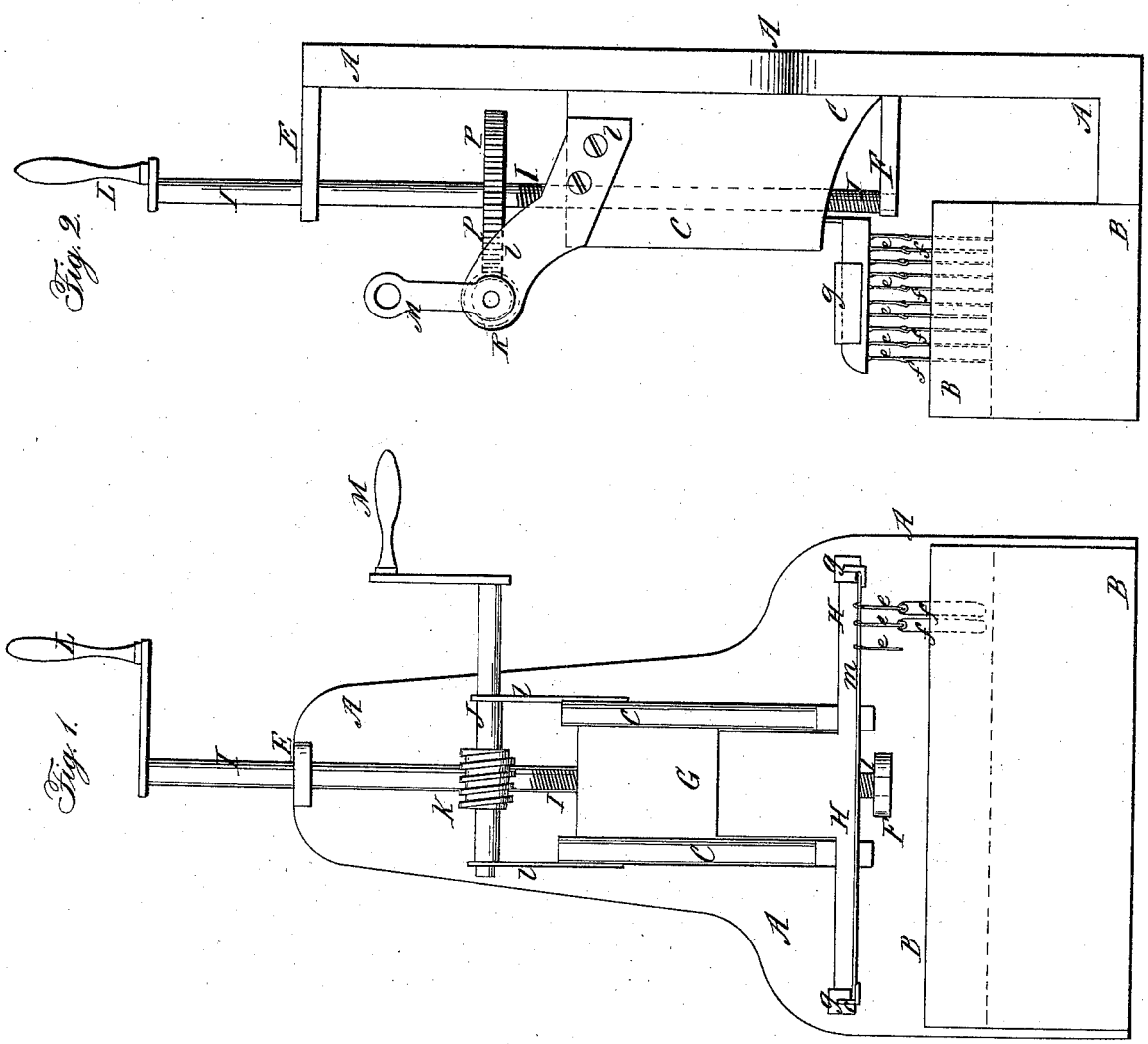
Witnesses:
William F. Gilbert
Thomas B. De Forest
Inventor:
Charles H. Bassett

UNITED STATES PATENT OFFICE.

CHARLES H. BASSETT, OF DERBY, CONNECTICUT.

IMPROVEMENT IN JAPANNING CORSET-STEELS, &c.

Specification forming part of Letters Patent No. 42,457, dated April 26, 1864.

*To all whom it may concern:*

Be it known that I, CHARLES H. BASSETT, of Derby, county of New Haven, and State of Connecticut, have invented a new and useful Method of Japanning Corset Steels and other Similar-Shaped Articles; and I do hereby declare the following to be a full, clear, and exact description thereof, reference being had to the accompanying drawings.

My invention has for its object to prevent the collection of a drop or superfluous particles of the japanning solution at the end or along the edges of corset-steels or other similar articles during the operation of dipping or japanning.

I have discovered that when a strip of metal—such, for instance, as a corset-steel—is submerged vertically into a tank or reservoir of japanning solution or mixture and then withdrawn longitudinally or lengthwise at a velocity about uniform, and a little less than the velocity at which the japanning mixture will run off from the strip, the japanning solution will be induced to flow evenly off of the strip without leaving any superfluous or surplus particles at the lower end of the strip.

Having reduced this discovery to a practical application for the object above stated, my invention consists in japanning corset-steels and other similar articles by submerging them into a solution or mixture of japanning material and withdrawing them at about a uniform velocity, less than the velocity at which the solution or mixture runs off of the article being japanned, as hereinafter more fully explained.

To enable those skilled in the art to make and use my invention, I will proceed to describe the mode of carrying out the same which I have successfully practiced.

In the accompanying drawings, Figure 1 is a front elevation, and Fig. 2 is a side elevation, of a machine or apparatus which I employ in carrying out my invention.

In both figures the same letters represent the same part of the apparatus.

A is the frame of the machine, and B a tank or vessel containing the japanning mixture or material.

The blue line indicates the level of the contents of tank B.

On the front side of frame A are two projecting stands, C C, between which, in suitable guides or ways, moves a vertically-reciprocating carriage, G. This carriage G has attached to it the sustaining-frame H, which carries the steels, and is actuated by means of a screw-shaft, I, which is arranged vertically in suitable boxes or bearings at E and F, and which is driven sometimes by power applied directly to it and sometimes through the medium of the worm K, which is on a horizontal shaft, J, and which meshes into a gear, P, fast on shaft I. The shaft J is hung in suitable bearings in two arms or stands, *l l*, projecting from the stands C C, and the worm K is arranged with a clutch on shaft J, so that shafts I and J may be geared together or allowed to turn independently of each other at pleasure.

The sustaining-frame H is simply a frame in the form of three sides of a rectangle, having its two opposite ends or sides provided with ledges, as seen at *o o*, on which rest the ends of the rods or bars on which are strung the hooks *e e e*, &c., which hold the steels *f f*, or other pieces to be dipped. *g g* are blocks or holders which are placed on the frame H to hold the ends of bars *m* down in place.

I have shown only a few of the hooks *e* and steels *f*, but it will be understood that the bars *m* may be strung quite full of them.

I have shown crank-handles L and M on shafts I and J, but of course in the working machine these shafts may be driven separately by means of belts running on fast and loose pulleys in the usual and well-known manner.

The operation of the machine here shown and described will be understood to be as follows, viz: The steels *f* being arranged on the hooks *e*, and the bars *m*, bearing said hooks, being all placed in the frame H over the tank B, as shown in the drawings, power is applied to the upper end of shaft I, the worm K being uncoupled from gear P, and shaft is rotated until its screw feeds the carriage G downward sufficiently far to cause the steels to be submerged in the japanning mixture or solution in tank B. The power is then taken off of shaft I, the worm K is clutched to shaft J, so as to drive gear P, and power is then applied to the latter, which causes the worm K to drive gear P, and consequently shaft I, in the contrary direction and at a velocity a little less than that at which the japanning solution is running off of the steels *f*.

The frame H, with the steels, is thus slowly elevated by the ascent of carriage G until the lower ends of the steels $f$ are once more above the surface of the japanning solution. The worm K may now be unclutched from J and power applied to I again, to more rapidly run up the frame to a position convenient for taking out the steels on their hooks and bars $m$, when they are treated in the usual manner.

By my method of taking the steels out of the japan, as described, the steels $f$ are left with an even and regular coating of japan, which is a great desideratum.

I wish it to be understood that many different constructions of apparatus may be employed involving the principle of operation on which my invention is based, and I do not wish it to be understood that I limit myself to the use of any particular construction of apparatus for carrying out my invention, though I have shown the particular machine which I employ, and which will work successfully.

Having explained fully the nature of my invention and the mode of carrying it out, what I claim as new, and desire to secure by Letters Patent, is—

The method substantially as described of japanning or coating steels and other articles by dipping them into the japanning solution and withdrawing them at a velocity less than that at which the japan flows off of the article.

CHARLES H. BASSETT.

Witnesses:
WILLIAM F. GILBERT,
THOMAS B. DE FOREST.